United States Patent
Haishima

(10) Patent No.: US 8,505,093 B2
(45) Date of Patent: Aug. 6, 2013

(54) INFORMATION PROCESSING DEVICE THAT VERIFIES A COMPUTER PROGRAM, AND GAMING MACHINE

(75) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1174 days.

(21) Appl. No.: 12/145,057

(22) Filed: Jun. 24, 2008

(65) Prior Publication Data

US 2009/0038009 A1 Feb. 5, 2009

(30) Foreign Application Priority Data

Jul. 31, 2007 (JP) ................................. 2007-198763

(51) Int. Cl.
*G06F 21/00* (2013.01)

(52) U.S. Cl.
USPC ............................................ 726/22; 713/187

(58) Field of Classification Search
USPC .............. 726/2, 21, 26, 22, 34; 713/100, 150; 711/100, 105, 111, 112; 709/211, 212, 216, 709/217, 229
See application file for complete search history.

(56) References Cited

U.S. PATENT DOCUMENTS

| | | | |
|---|---|---|---|
| 4,727,544 A | 2/1988 | Brunner et al. | |
| 6,234,898 B1 | 5/2001 | Belamant et al. | |
| 2003/0032485 A1 | 2/2003 | Cockerille et al. | |
| 2006/0036874 A1* | 2/2006 | Cockerille et al. | 713/187 |
| 2006/0240888 A1 | 10/2006 | Tanimura | |
| 2007/0011180 A1* | 1/2007 | Peretz et al. | 707/100 |

FOREIGN PATENT DOCUMENTS

| | | |
|---|---|---|
| CN | 1207817 | 2/1999 |
| EP | 0447043 | 9/1991 |
| EP | 1 496 419 A1 | 1/2005 |
| JP | 2007-125297 | 5/2007 |
| WO | WO 01/67218 A1 | 9/2001 |

OTHER PUBLICATIONS

International-Style Search Report, Official Action, from corresponding Macau Application, No. I/837; English translation included; mailed Apr. 26, 2010.

* cited by examiner

*Primary Examiner* — Jeffrey Pwu
*Assistant Examiner* — Nega Woldemariam
(74) *Attorney, Agent, or Firm* — Lexyoume IP Meister, PLLC.

(57) ABSTRACT

An apparatus for processing information includes a memory device and a controller. The controller is configured to: access to a memory area in the memory device in which information related to a location of data including a computer program is stored; store contents of the memory area as a first inspection code into a first memory area of the memory device; at predetermined timing, access to a memory area in the memory device in which latest information is stored; store contents of the memory area as a second inspection code into a second memory area; compare the first and the second inspection codes; if the second inspection code does not agree with the first inspection code, output an error signal indicating inconsistency between the first and the second inspection codes; and if the second inspection code agrees with the first inspection code, perform verification of the computer program.

10 Claims, 8 Drawing Sheets

FIG. 4

| T1 | T2 | T3 | T4 | T5 | T6 | ... | T7 |
|---|---|---|---|---|---|---|---|
| PROGRAM ID-1 | PROGRAM NAME | USER NAME | EXECUTABLE FLAG | VIRTUAL MEMORY PAGE NUMBER N | ADDRESS OF FIRST PAGE OF VIRTUAL MEMORY | ……… | ADDRESS OF N-TH PAGE OF VIRTUAL MEMORY |
| PROGRAM ID-2 | PROGRAM NAME | USER NAME | EXECUTABLE FLAG | VIRTUAL MEMORY PAGE NUMBER M | ADDRESS OF FIRST PAGE OF VIRTUAL MEMORY | ……… | ADDRESS OF M-TH PAGE OF VIRTUAL MEMORY |
| PROGRAM ID-3 | PROGRAM NAME | USER NAME | EXECUTABLE FLAG | VIRTUAL MEMORY PAGE NUMBER L | ADDRESS OF FIRST PAGE OF VIRTUAL MEMORY | ……… | ADDRESS OF L-TH PAGE OF VIRTUAL MEMORY |
| ……… | | | | | | | |

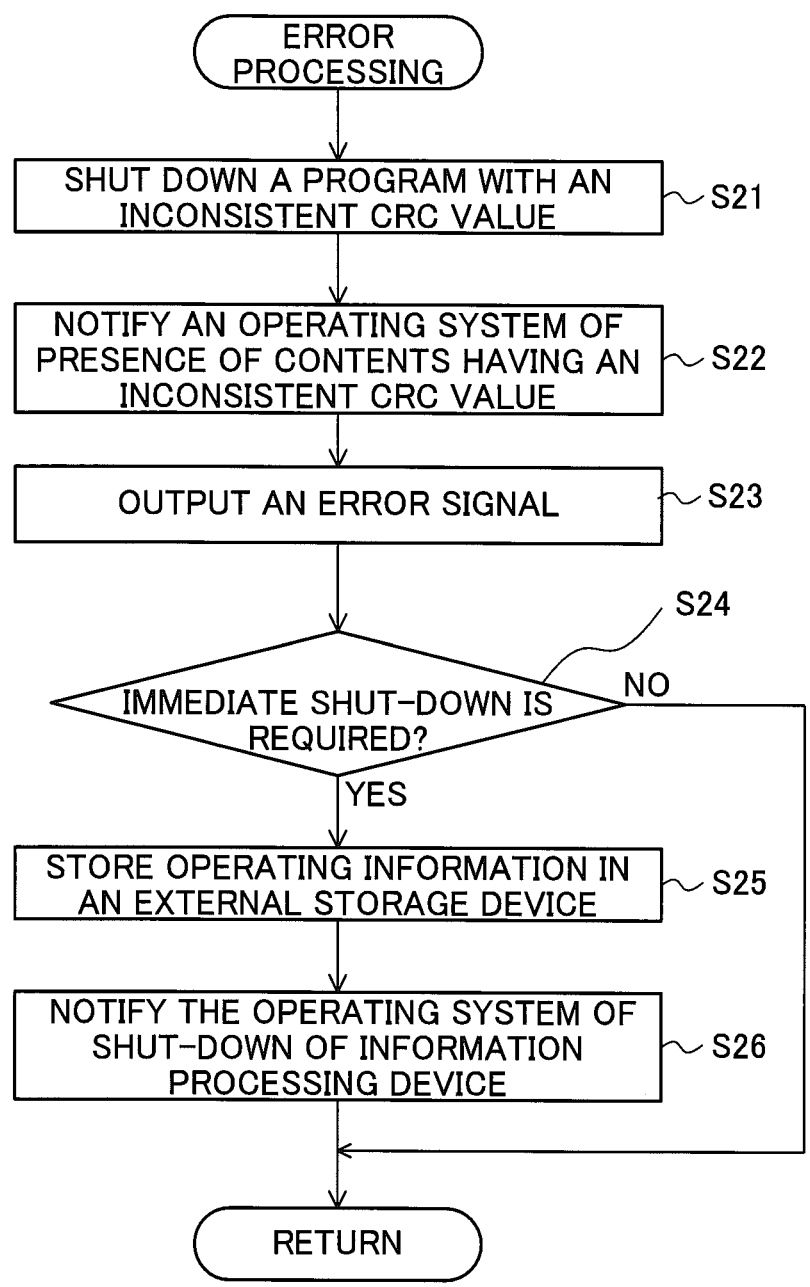

INFORMATION PROCESSING DEVICE THAT VERIFIES A COMPUTER PROGRAM, AND GAMING MACHINE

This application is based on and claims the benefit of priority from Japanese Patent Application No. 2007-198763, filed on 31 Jul. 2007, the content of which is incorporated herein by reference.

BACKGROUND OF THE INVENTION

1. Field of the Invention

The present invention relates to an information processing device that verifies as needed a computer program stored in a memory to restrict the operation of the computer program for a case in which the computer program is found to be tampered with. Specifically, the present invention relates to a gaming machine that detects tampering of contents of the memory, which has been made while a gaming program is in operation, so as to restrict the operation of the gaming program.

2. Related Art

Conventionally, computer programs for verifying a gaming program of a gaming machine have been known. These computer programs for the gaming machine are written to describe processing for verifying a gaming program and a game system program (see Japanese Unexamined Patent Application, First Publication No. 2007-125297).

In addition, a gaming machine is known by U.S. Patent Application Publication No. 2006/0240888. A gaming machine includes: a card slot for a memory card storing gaming information; a gaming board including a ROM storing a verification program for verifying the gaming information and a preliminary verification program for verifying the verification program itself; and a motherboard including a RAM. The gaming machine verifies gaming information by the verification program that is stored in the RAM on the motherboard after the completion of the verification performed for the verification program by the preliminary verification program.

In the conventional methods for verifying gaming machines, a verification program executed by a CPU of a gaming machine scans the entire contents of a main memory, thus verifying the gaming machine. The verification includes steps of: verifying consistency of contents between an external memory and the main memory at a time of loading of a computer program from the external memory to the main memory; and performing continuous verification of the maintenance of the initial contents of the computer program loaded to the main memory.

However, in recent operating systems a method called dynamic memory allocation is adopted, in which a kernel, a basic portion of an operating system, allocates a main memory having discontinuous addresses to a single program. Although, the method brings advantages that a number of computer programs can be executed in parallel and in random order, it does not allow the main memory having continuous addresses to be read and verified as the conventional method.

SUMMARY OF THE INVENTION

The present invention provides an information processing device that has an operating system referencing a memory device by way of dynamic memory allocation and which can verify a computer program using a verification program operating as a part of a function of a kernel by referencing the contents of the memory device where the computer program to be verified lies, thereby detecting damage and tampering of the contents of the memory device. In other words, the present invention provides the information processing device that can assure the computer program that it is free of damage and tampering as long as it is present on the memory device.

In a first aspect of the present invention, an apparatus for processing information is provided, which includes a memory device and a controller. The controller is configured to: access to a memory area in the memory device in which information related to a location of data including a computer program is stored; store contents of the memory area as a first inspection code into a first memory area of the memory device; at predetermined timing, access to a memory area in the memory device in which latest information related to the location of data including the computer program is stored; store contents of the memory area as a second inspection code into a second memory area of the memory device; compare the first inspection code and the second inspection code; if the second inspection code does not agree with the first inspection code, output an error signal indicating inconsistency between the first inspection code and the second inspection code; and if the second inspection code agrees with the first inspection code, perform verification of the computer program.

As described above, the memory device included in the apparatus for processing information is controlled according to dynamic memory allocation. An operating system utilizing the dynamic memory allocation allows the apparatus for processing information to reference the information in the area of the memory device where the computer program to be verified lies so as to reference the contents of the computer program, even if discontinuous addresses are allocated for the computer program in the memory device. In other words, the apparatus according to the present invention verifies the computer program lying in the memory device where addresses are discontinuously allocated, differing from a conventional technique that performs verification reading a memory device of continuous addresses.

The operating system is a basic program that enables the computer program to operate. A basic portion of the operating system is called kernel, which performs administration such as resource control of a system and control of interactions between hardware and a computer program. The computer program can use individual functions included in the kernel that are provided as system calls. In an operating system supporting a multi-task environment, a kernel performs dynamic memory allocation so as to control addresses used by each of a plurality of computer programs on a page by page basis. Memory controlled on a page by page basis is called virtual memory. The virtual memory possesses a theoretical address, which is defined separately from a physical address that is electronically presented on a computer address bus circuitry.

Using a system call provided by the kernel or operating as a built-in portion of the kernel, the verification program uses the function of the kernel of the operating system where the dynamic memory allocation is implemented. The verification program, which can reference a table of virtual memory that stores the number of pages of virtual memory and a memory address corresponding to each page, can reference the contents of a program to be verified that lies in the virtual memory.

An example of the operating system is Linux. Alternatively, it is possible to adopt other systems such as Microsoft Windows (Registered trademark) and UNIX (Registered Trademark).

An example of building the verification program into a kernel is to activate the verification program in a swapper function that is associated with the initialization of variables in the kernel of a Linux operating system. Another example is to build the verification program into an execve function that is one of system calls provided by a kernel of a Linux operating system. It should be noted that these examples do not limit the component of a kernel that activates the verification program or into which the verification program is built.

The apparatus for processing information described above is required to cause the verification program to reference the table of virtual memory indicating location of a program to be verified in the memory device each time the verification program performs verification. The reason for this is that the table of virtual memory is updated whenever need arises by the kernel that allocates a plurality of computer programs to the memory device. In other words, the verification program references the latest table of virtual memory that provides the location of the program to be verified in the memory device.

The controller described above is an integrated circuit that has the following features: The controller includes terminals provided for an address bus, a data bus and an input/output permission logic etc., and built-in components such as a calculation unit, a control unit and a decoder etc. The controller can process data and a set of instruction, which are received via the data bus, in predetermined order. The controller can not only transmits necessary information and instruction to external components, but also receive information from the external components.

Different types of controllers may be adopted, such as a controller made of one integrated circuit, a controller having a plurality of input/output functions so as to operate with peripheral chips, and an integrated controller having built-in chips with additional functions. Examples of the controllers are peripheral chips such as QX677 and P35 Of Intel Corporation; however the present invention is not limited to these examples.

The inspection code described above may be a value representative of the contents of the memory device where the computer program lies. It may be possible to use a hush function that restricts a maximal memory by a residual calculation so as to calculate a value of a predetermined number of bytes representative of the contents of the memory device. In this connection, "hush function" is a technical word for computers to indicate an operation to acquire a value representative of data or a function to be used for obtaining the value.

Any type of outputting of an error signal by the controller described above may be adopted as long as it notifies a user of an occurrence of the error. The following are examples for this: The controller outputs information related to an error to a communication interface of the apparatus for processing information. The controller causes a display device to display the information about the error. The controller delivers the error signal as logical output. The controller delivers the error signal as logic for a specific address of an input/output port. The controller performs processing for rewriting a specific value in a memory area that the apparatus for processing information can reference. The controller performs processing for rewriting a specific value in a memory area that the operating system prepares. In addition, a combination between these examples described above may also be adopted.

In a second aspect of the present invention, an apparatus for processing information is provided, in which a verification program executed by the controller determines whether the second inspection code agrees with the first inspection code.

With the apparatus described above, the controller can select various types of techniques to determine whether the contents agree between a memory area and the other memory area. One example of these techniques is comparison of the contents between the memory areas. As an exemplary method applied to the comparison, it is possible to select an appropriate one such as: using instruction of comparison included in the set of instructions possessed by the controller; using a function of comparison included in service calls etc. provided by an operating system; using a comparison function provided by a compiler that converts a source code into an executable form; and using a comparison operator provided in the form of script language that operates on an operating system. Another example is to adopt a technique to determine the consistency based on the difference of contents between the two memory areas, which are numerically treated.

In this way, the apparatus for processing information can assure that there is no damage or tampering in the program to be verified according to the consistency of contents between the two memory areas.

In a third aspect of the present invention, an apparatus for processing information is provided, in which the controller executes a verification program that restricts the operation of the computer program.

As the restriction described above, it may be possible to use a program control function possessed by an operating system so as to stop the operation of the computer program in which damage or tampering has been found. Alternatively, it may be possible to restrict the access to an administrator such that a user can not access to the memory area where the problematic computer program is found to lie.

In this way, the apparatus for processing information can prevent the problematic program from adversely affecting the apparatus, particularly the memory device.

In a fourth aspect of the present invention, an apparatus for processing information is provided, in which the controller executes a verification program that restricts the operation of the apparatus.

As the restriction described above, it may be possible to inhibit an input/output port from writing and reading by a computer program executed by the controller.

It may be possible for the computer program executed by the controller to notify an operating system of execution of automatic shutdown, for example, so as to shut down the apparatus for processing information.

In this way, the apparatus for processing information can prevent the problematic program from adversely affecting the apparatus, particularly the components that are electrically connected via a system bus.

In a fifth aspect of the present invention, an apparatus for processing information is provided, in which a Cyclic Redundancy Check is used for the first inspection code and the second inspection code.

The CRC described above may have 16 bits wide, 32 bits wide, or other widths. Any generation algorithm is acceptable as long as it can calculate a CRC value to be used for the verification of the computer program in the apparatus for processing information. In this connection, CRC represents a short for Cyclic Redundancy Check, which is a term of computer technology related to a type of error code for detecting an error during copying of data between storage media and transmission and reception of data via communication network.

Since the apparatus for processing information verifies the computer program according to the consistency of values having 32 bits wide, it is possible to decrease the load for the controller in terms of tasks required for verification, compared with a technique in which a whole program lying over a plurality of memory areas is thoroughly verified. This results in a speed-up of verification. Particularly, even if the verification program is continued to periodically run in parallel with a gaming program, it is possible to minimize the adverse restriction for the performance of the gaming program.

In a sixth aspect of the present invention, an apparatus for processing information is provided, in which the controller determines the predetermined timing with a verification program that uses a timing signal generated independently of the computer program to be verified.

It may be possible to select an appropriate one from various types of techniques in which the verification program uses the timing signal generated independently of the computer program to be verified. One example is to use a Real Time Clock (RTC) built in the apparatus for processing information. Another example is to connect a timing generating circuit with a system bus of the apparatus for processing information. Still another example is to use a time function that is provided by the compiler environment that converts a source code into an executable form.

In this way, the apparatus for processing information can notify the controller of an occurrence of need for periodic verification even if the controller performs processing other than that of verification program. This allows the verification of the computer program in the apparatus for processing information to be continued periodically.

In a seventh aspect of the present invention, an apparatus for processing information is provided, in which the apparatus for processing information operates in a gaming machine that includes a game controller for controlling a game with a gaming program and a display device for displaying information related to the game, and the computer program verified by the apparatus for processing information is the gaming program.

The apparatus for processing information described above verifies the computer program lying in the memory device in an operating system that performing dynamic memory allocation.

In this way, the gaming machine can continue to periodically assure that the gaming program is not damaged or tampered with at a time of startup and throughout a period of operation.

BRIEF DESCRIPTION OF THE DRAWINGS

FIG. 4 is a diagram illustrating a table that shows an example of a linear list for indicating the addresses of a main memory to which the information processing device according to the present invention refers;

FIG. 5 is a flow chart showing error processing of the information processing device according to the present invention;

DETAILED DESCRIPTION OF THE INVENTION

A description is provided below regarding embodiments of the present invention. It should be noted that the scope of the present invention is not limited to the following embodiments.

First Embodiment

According to a first embodiment of the present invention, an information processing device operates as follows: The information processing device retrieves location information of a main memory in which a computer program is stored from a virtual memory table, and references contents of the main memory corresponding to the location information, converting the contents into an inspection code to be stored in an array. Periodically referencing contents of the main memory based on information on the latest virtual memory table, the information processing device converts the contents into an inspection code so as to determine whether the inspection code agrees with that stored in the array. If they do not agree with each other, the information processing device does not allow the computer program to be executed. If they agree with each other, the information processing device verifies the computer program.

Second Embodiment

In a second embodiment of the present invention, a gaming machine that controls a game by a computer program and displays information relating to the game includes an information processing device so as to verify the computer program for the game at a startup and at regular intervals continuously.

Third Embodiment

A third embodiment exemplifies an information processing device that verifies a computer program at predetermined timing.

Figure 1:
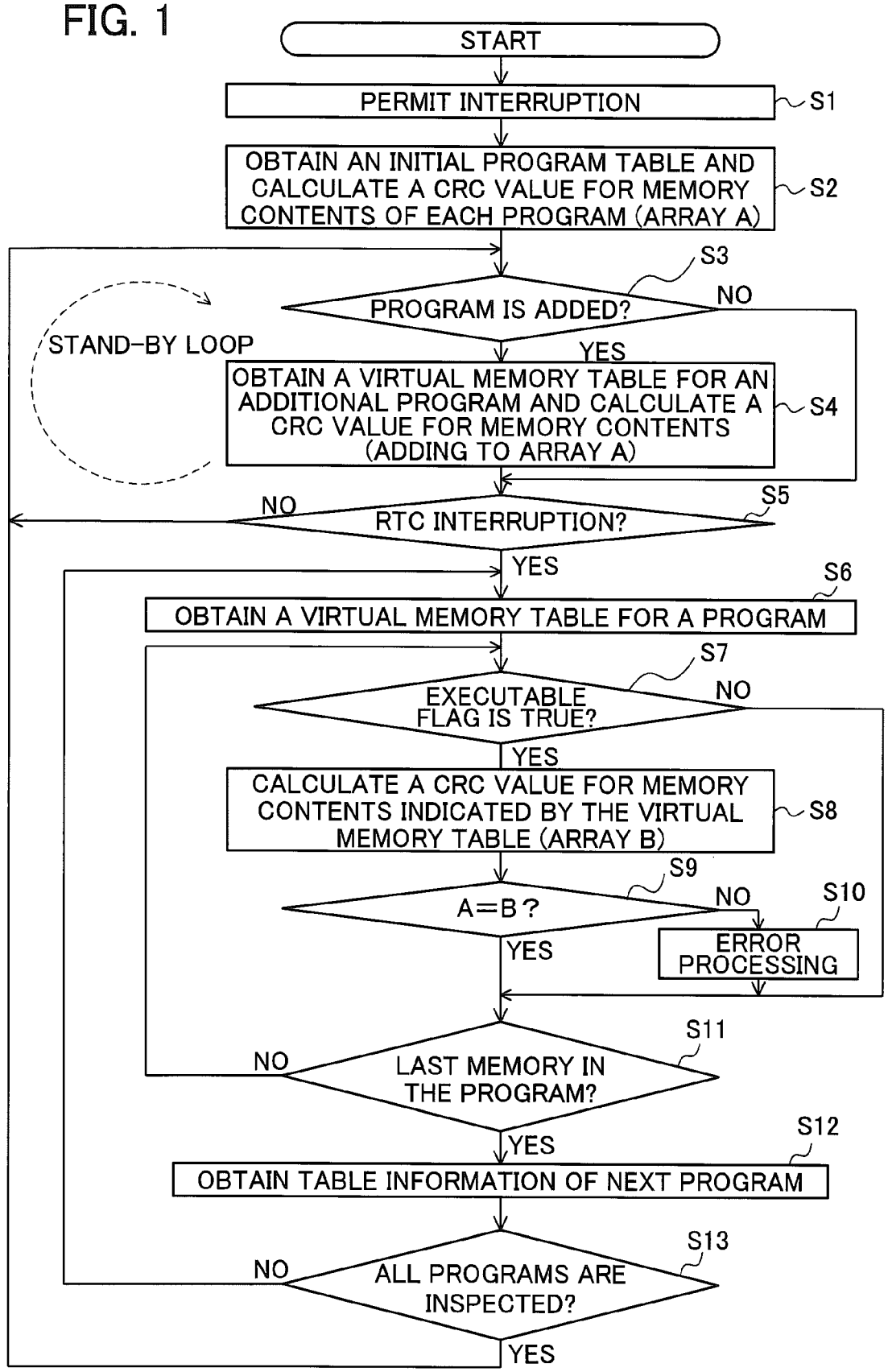
FIG. 1 is a flow chart showing an information processing device according to the present invention that verifies a computer program at predetermined timing.

FIG. 1 is a flow chart showing the information processing device that verifies the computer program at predetermined timing.

The entire flow shown in FIG. 1 is called from a swapper function (not shown) constituting a kernel of the Linux operating system, or another function constituting the kernel called from the swapper function. For example, the flow is called from an execve function (not shown) included in system calls. Therefore, a verification program for verifying the computer program included in the information processing device can use functions of the kernel and can reference information related to the location of a main memory in which the computer program is stored, to which usage area is allocated in a virtual memory according to dynamic memory allocation by the kernel. In other words, the verification program can reference contents of the computer program that lies in the main memory.

In FIG. 1, an information processing device 1 permits an interruption to a controller 10 (Step S1). Subsequently, the information processing device 1 obtains an initial program table, i.e. a table in a linear list format of all the programs in operation, immediately after a startup of a verification program, and calculates a CRC value of memory contents indicated by each program, storing the CRC value in an array A (Step S2). The information processing device 1 determines whether a program has been added (Step S3). If any, the information processing device 1 retrieves a virtual memory table of the added program and calculates a CRC value of memory contents indicated by the added program, storing in addition the CRC value in the array A (Step S4). If there is no addition of programs in Step S3, the information processing device 1 determines whether an RTC interruption has occurred (Step S5). If an RTC interrupt has occurred, the information processing device 1 advances the processing from Step S5 to the next Step S6. That is, the information processing device 1 obtains a virtual memory table used by a program lying in a main memory 13 (Step S6). Subsequently, the information processing device 1 determines whether an executable flag of the program included in the table is true or false (Step S7). If the flag is true, the information processing device 1 calculates a CRC value of memory contents indicated by the virtual memory table, and stores the CRC value in an array B (Step S8). Subsequently, the information processing device 1 determines whether the CRC value stored in the array A that is calculated for the program to be verified agrees with the CRC value stored in the array B (Step S9). If the two values agree with each other, the information processing device 1 determines whether it has finished verification for the last memory area for the computer program (Step S11). If the verification is finished up to the last memory area, the information processing device 1 retrieves the table information for the next program from the table obtained in Step S2 (Step S12). Subsequently, the information processing device 1 determines whether all of the programs have been verified or not (Step S13).

If the executable flag is false in Step S7, the information processing device 1 performs Step S11. If the value stored in the array A is not consistent with the value stored in the array B in Step S9, the information processing device 1 performs error processing (Step S10). If the verification is not finished up to the last memory for the computer program in Step S11, the information processing device 1 returns the processing to Step S7. If all the programs are not verified in Step S13, the information processing device 1 returns the processing to Step S6. In contrast, if all the programs are verified in Step S13, the information processing device 1 returns the processing to Step S3. If an RTC interruption has not occurred in Step S5, the information processing device 1 returns the processing to Step S3.

It is when the consistency is verified in Step S9 and the determination is true (YES) in Step S13 that all the programs are considered to be verified. The result of the verification can be saved appropriately, for example, by a program for saving the result to an external storage device 15 shown in FIG. 2.

Step S5 can alternatively be replaced by a step detecting a signal received from an external device connected via a communication interface 22 shown in FIG. 2 (described later). Accordingly, it is possible to select one of an RTC interruption and the detection of a signal.

The verification program shown in FIG. 1 waits for an RTC interruption to occur in Step S5, while reiterating the loop from Steps S3 to S5.

Since the processing returns from Step S5 and Step S13 to Step S3, which lies subsequent to Step S2, the first CRC value stored in the array A, which is obtained in Step S2, can be saved throughout the operation of the verification program.

The information processing device 1 of the present invention continues to verify whether the array A agrees with the array B for all computer programs on the main memory 13. The array A includes an initial CRC value that is calculated for each computer program, and the array B includes a CRC value, which is continued to calculate repeatedly for each computer program. In such an arrangement, the information processing device 1 can continue to periodically detect damage and tampering of each computer program to be verified, as long as each computer program is present in the main memory 13, thus continuing verification of each computer program. Therefore, the information processing device 1, can assure that the computer program to be verified has not been damaged or tampered with while the verification program is in operation.

Since a real-time clock (RTC) 21, which outputs independent time information, can be used to determine the timing included in the verification program to start the determination of consistency of CRC values, the information processing device 1 allows a computer program to be periodically assured.

Figure 2:
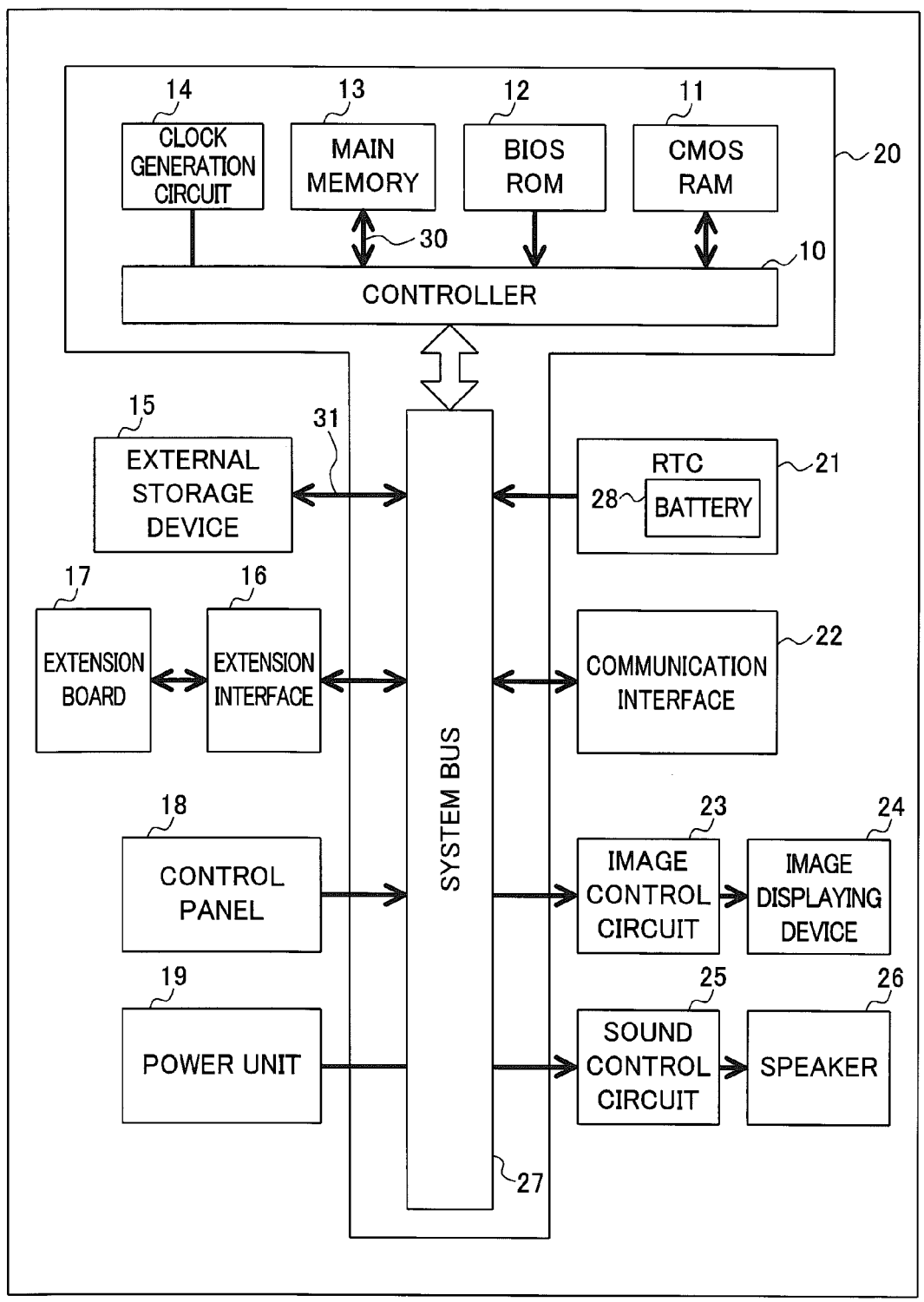
FIG. 2 is a block diagram showing a setup of the information processing device according to the present invention.

FIG. 2 is a block diagram illustrating a setup of an information processing device of the present invention. An information processing device 1 includes a power unit 19 that provides electricity required for electrical devices installed therein. A controller 10, installed in the information processing device 1, includes a CMOSRAM 11 storing editable information and the like concerning initial setting, which is read by the information processing device 1 after a power-on or a reset, a BIOSROM 12 storing information concerning boot operation such as basic input/output, a main memory 13, and a clock generation circuit 14. Furthermore, the controller 10 is connected to an external storage device 15, an extension interface 16, a control panel 18, an RTC 21, a communication interface 22, an image control circuit 23, and a sound control circuit 25 via a system bus 27. An extension board 17, which can add functions to the information processing device 1, can be connected to the extension interface 16 as needed.

The main memory 13 operates as main storage of the controller 10 via a memory bus 30. Unless otherwise stated, the term "memory" designates the main memory 13. The RTC 21 is a real-time clock circuit including a battery 28 to continue operation even if the power unit 19 is suspended. Accordingly, the RTC 21 operates asynchronously to the operation of the controller 10 and outputs time information. The clock generation circuit 14 is a circuit generating an operation clock of the controller 10. The clock generation circuit 14 may include a frequency dividing circuit. The extension board 17 includes an additional gaming board and the like which use functions of the controller 10 via the extension interface 16. An image displaying device 24 is connected to the image control circuit 23. A speaker 26 is connected to the sound control circuit 25. The sound control circuit 25 is a circuit generating a beeping sound to notify a user of an error and the like occurring in the operation of a computer program concerning a boot operation stored in the BIOSROM 12, a circuit increasing and decreasing the amplitude by converting digital sound data into an analog sound signal, a circuit of like kind, or a combination of the above. There is flexibility for selection of type of the speaker 26.

After the information processing device 1 starts operation from an initial state, i.e. starts up after a power-on or a reset, the controller 10 checks the connection with the external storage device 15 and the main memory 13, boots an operating system (not shown) stored in the external storage device 15, and copies a file from the external storage device 15 to the main memory 13 according to the contents of the BIOSROM 12 defining basic input/output.

The operating system is a basic program that allows components included in the information processing device 1, such as the controller 10, the main memory 13, the external storage device 15 and the like, to operate in a multi-task environment. The operating system performs dynamic memory allocation so as to control addresses of a memory on a page by page basis, which each of a plurality of computer programs on the main memory 13 uses. Furthermore, the operating system provides each of the computer programs with information such as a program ID, a user ID, an executable flag, a virtual memory page number, a start page number of virtual memory, and the like, in a standard format to administer the computer programs.

A preferable example of the standard format is a linear list, which is one type of data structure that is used for representing aligned data.

The communication interface 22 has a function to communicate with external components which can send/receive information to/from the information processing device 1, using a signal of a predetermined format. The signal of the predetermined format includes: a signal defined in International Telecommunication Union Telecommunication Standardization Sector (ITU-T) Recommendations; a signal conforming to the Ethernet (Registered Trademark) standard using twisted pair cables such as 100 Base-T; a signal conforming to other Ethernet standards; a signal conforming to Bluetooth standard; a signal using radio waves, infrared rays or light energy for communication; any signal conforming to the abovementioned standards; and a combination of the above.

The communication interface 22 can receive a start signal so as to activate a verification program of the present invention at predetermined timing, which is available from the programs executed by the controller 10.

Figure 3:
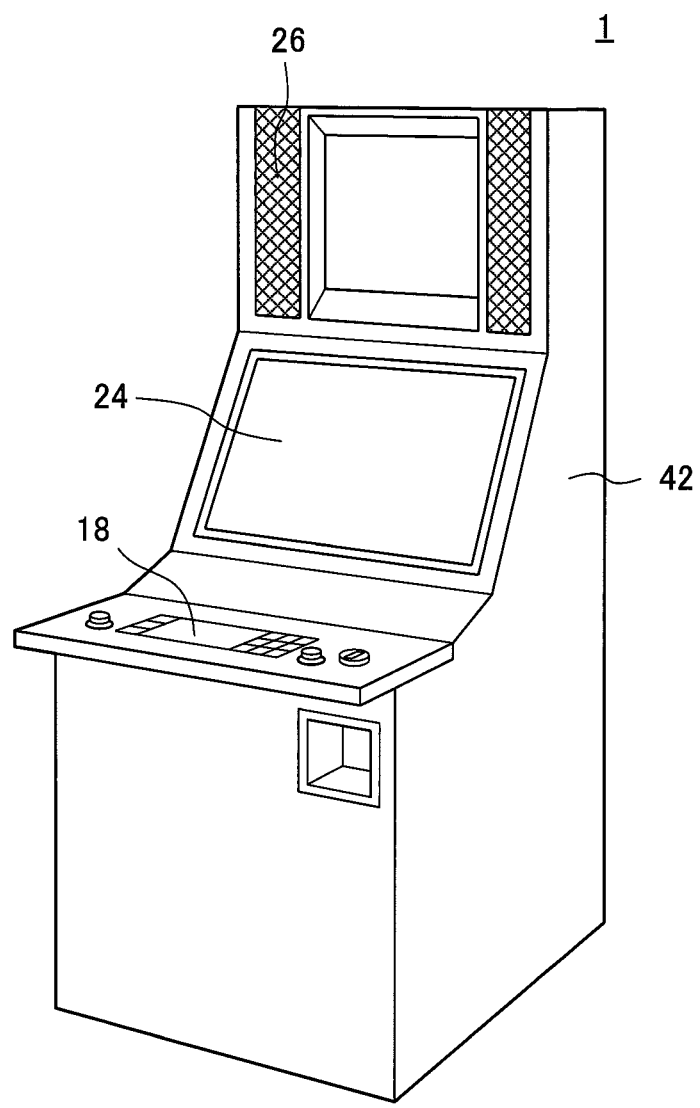
FIG. 3 is a perspective view showing an example of an appearance of the information processing device according to the present invention.

FIG. 3 is a perspective view showing an example of an appearance of the information processing device 1 of the present invention. The information processing device 1 has a cabinet 42, which has the image displaying device 24, the control panel 18 and the speaker 26 on a front face thereof. The information processing device 1 accepts operations by a user through the control panel 18, and displays necessary information and the like on the image displaying device 24. If damage, tampering, and the like are detected in a computer program to be verified, the information processing device 1 may also display information related to results of detection on the image displaying device 24, or output a sound signal with the speaker 26 for notifying a user of an occurrence of an error.

The information processing device 1 of the present invention can be a part of a gaming machine that includes means for performing a game operation, means for controlling a game, and means for displaying visual contents related to the game. In addition, the information processing device 1 can provide a gaming service in which the operation by a user and a display of images are accompanied by sound output from the speaker 26.

The information processing device 1 for verifying computer programs can be included in other devices in addition to the gaming machine described above. The information processing device 1 of the present invention can be included in, for example, an automatic teller machine, an automated dispenser of valuable papers, an automated voucher dispenser, and the like.

A timing signal generated by the RTC 21 shown in FIG. 2 is preferably used to determine the timing at which the information processing device 1 starts verifying a computer program to be verified. Alternatively, a logic delivered by a computer program that processes the timing signal generated by the RTC 21, a signal received from another information processing device connected to the information processing device 1 via the communication interface 22, a combination of the above, or a logic of a combination of the above, can be used.

FIG. 4 is a table showing an example of a linear list for indicating the address of the main memory 13 to which the information processing device 1 refers. A linear list is generated for each computer program. FIG. 4 shows lists generated for 3 computer programs; however, the number of lists is not limited thereto, but the number of lists corresponding to that of computer programs may be prepared. For example, a list of programs for a program ID-1 in a column T1 includes, a program name T2, a user name T3, and an executable flag T4. A page number T5 of a virtual memory in the list shows that the program ID-1 uses N pages of virtual memory. Additionally, an address of the first page of the virtual memory T6 and an address of the N-th page of the virtual memory T7 and the like are included in the list. A list is similarly generated for programs having other program IDs.

A memory address defined on a page by page basis in the linear list is generated according to a memory management method of an operating system that performs dynamic memory allocation. Therefore, in the operating system to which the dynamic memory allocation is applied, it is possible to find an address of a virtual memory corresponding to a particular program by referencing the linear list.

FIG. 5 is a flow chart showing error processing in the verification illustrated in FIG. 1. In the error processing, the information processing device 1 shuts down a computer program in which an initial CRC value does not agree with a CRC value at a time of verification (Step S21), notifies the operating system of the existence of the problematic computer program (Step S22), and outputs an error signal (Step S23). Subsequently, the information processing device 1 accesses to a database related to information about computer programs that will be harmful if they stay in the main memory 13 so as to determine whether it is necessary to immediately shut down the information processing device 1 (Step S24). If the information processing device 1 does not determine that it is necessary, it terminates the error processing.

If the information processing device 1 determines that it is necessary to shut down the information processing device 1 in Step S24, it causes the external storage device 15 to store operating information of the information processing device 1 (Step 25), notifying the operating system to shut down the information processing device 1 (Step S26).

Step S22 is a step in which the controller 10 included in the information processing device 1, shown as the third aspect of the present invention, executes a verification program that restricts operation of the computer program. Step S26 is a step in which the controller 10 included in the information processing device 1, shown as the fourth aspect of the present invention, executes a verification program that restricts operation of the information processing device 1.

In Step S23 of outputting an error signal, the information processing device 1 may output an electric signal to the image control circuit 25 shown in FIG. 2 and cause the image displaying device 24 to display predetermined text information, image information, and the like so as to notify a user of damage or tampering of the computer program. Alternatively, in Step S23 of outputting an error signal, the information processing device 1 may output an electric signal as described above and notify a user with a sound through the speaker 26. Furthermore, in Step S23 of outputting an error signal, the information processing device 1 may alternatively notify a user via the communication interface 22 shown in FIG. 2, in a form of a signal available for information transmission, such as: a phase-modulated electric signal, a frequency-modulated electric wave, an amplitude-modulated optical signal, and the like.

Thus, the information processing device 1 can detect the damage and tampering of the computer program to be verified during a period of continuously repeated verification, and restrict the operation of the computer program if there is damage or tampering. In addition, the information processing device 1 can restrict the operation of the information processing device 1 if there is damage or tampering in the computer program.

Fourth Embodiment

A fourth embodiment exemplifies an information processing device 1 that verifies computer programs at a startup.

Figure 6:
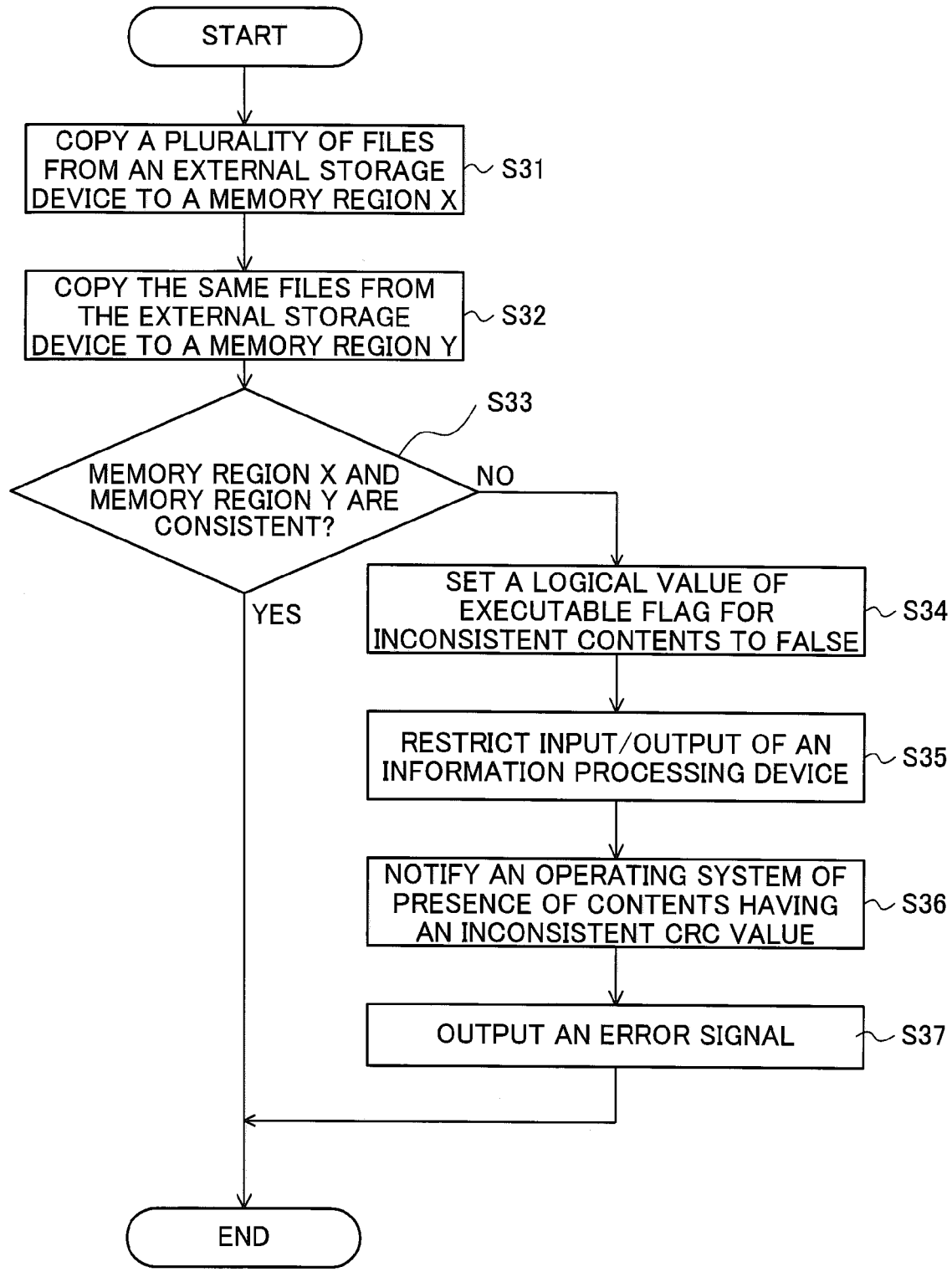
FIG. 6 is a flow chart showing the verification of a computer program performed by the information processing device according to the present invention after a startup from the initial state.

FIG. 6 is a flow chart showing the information processing device 1 of the present invention verifying the computer program after a startup from the initial state.

The information processing device 1 handles a file, which is a unit of information processed by an operating system, and copies a plurality of files from an external storage device 15 to a memory area X (Step S31). The file can be a computer program with an executable flag T4 being true in the table shown in FIG. 4, or a numerical value or a character with an executable flag T4 being false. Address information of the memory area X in a main memory 13 is administered by dynamic memory allocation. Subsequently, the information processing device 1 copies the same files from the external storage device 15 to a memory area Y (Step S32). The memory area Y is also under dynamic memory allocation. Subsequently, the information processing device 1 determines whether the contents of the memory area X and those of the memory area Y are consistent (Step S33). If they are consistent, the information processing device 1 terminates the processing. If they are not consistent in Step S33, the information processing device 1 sets a logical value of the executable flag to false (Step S34), restricts input/output of the information processing device 1 (Step S35), notifies the operating system of an occurrence of inconsistent contents (Step S36), outputs a signal indicating an error (Step S37), and terminates the processing.

If the contents are consistent with each other in Step S33, it indicates that the files are verified at a startup of the information processing device 1. In other words, computer programs included in the files are verified. The results of the verification can be saved appropriately, for example, by a computer program that implements saving performed by the external storage device 15 shown in FIG. 2.

Step S34 is a step in which the controller 10 included in the information processing device 1, shown as the third aspect of the present invention, executes a verification program that restricts operation of the computer program. Step S35 is a step in which the controller 10 included in the information processing device 1 executes a verification program that restricts operation of the information processing device 1.

Step S27 of outputting an error signal is similar to Step S23 shown in FIG. 5.

The information processing device 1 can verify the files, while the files are copied from the external storage device 15 to the main memory 13. In other words, the information processing device 1 can assure at its startup that the files which will undergo verification have not been damaged or tampered with.

Fifth Embodiment

A fifth embodiment exemplifies a verification program that is executed by a controller 10 included in an information processing device 1 and which verifies the consistency of contents between two memory areas.

The controller 10 shown in FIG. 2, as described in the third embodiment, references a main memory 13 by using a function of the kernel performing dynamic memory allocation in the information processing device 1.

As described in the fourth embodiment, the information processing device 1 can verify, at a startup from the initial state, the files to be verified while the files are copied from an external storage device 15 to the main memory 13. In addition, the information processing device 1 can continue to periodically detect damage and tampering of a computer program using inspection codes, as long as the computer program is present in the main memory 13.

As described above, the verification is performed in the fourth embodiment by determining whether the two memory areas are consistent (Step S33 in FIG. 6), and in the third embodiment by determining whether the two inspection codes are consistent (Step S9 of FIG. 1).

The controller 10 can use: instruction sets included in the controller 10 itself; service calls provided by an operating system; functions provided by a compiler which converts a source code of a computer program into an executable format; operators and the like provided by scripting languages running on an operating system; and a combination of the above. The controller 10 can, for example, determine the consistency of contents between two memories by comparison. The controller 10 can, as another example, determine the consistency of contents between two memories, using integer arithmetic instructions included in the instruction sets of the controller 10. The controller 10 performs the determination as follows: dividing each of the two memory contents into information units which can be calculated by the controller 10; calculating, for each division, the difference between the two memories; and determining whether the difference is 0 for each division.

The information processing device 1 of the present invention can determine the consistency of contents between the two memories by a computer program including a comparison instruction or a difference calculation that is executed by the controller 10.

Furthermore, the verification program in the information processing device 1 uses functions of a kernel performing dynamic memory allocation. An embedded program for judging the consistency of contents between the two memories in the verification program allows the verification program to reference the contents of the main memory 13 on which the computer programs are present, which are administered by dynamic memory allocation.

The program for judging the consistency of the two memory contents can reference the main memory 13 on which inspection codes are present. Therefore, the determination of consistency of two inspection codes in Step S9 shown in FIG. 1 is included in the program for determining the consistency of contents between the two memories.

Sixth Embodiment

A sixth embodiment exemplifies a verification program that is executed by a controller 10 included in an information processing device 1 and which restricts operation of computer programs that will undergo verification.

As described in the third embodiment and shown in Step S7 of FIG. 1, the verification program references the virtual memory table indicating the location of a computer program to be verified on a main memory 13 and determines whether the logical value of the executable flag is true. If the computer program to be verified is executable during a period in which the computer program is present in the main memory 13, a logical value of the executable flag thereof in the virtual memory table is true. As shown in Step S21 of FIG. 5, the error processing performed during the period includes shutting down a program having an inconsistent CRC value.

Furthermore, as described in the fourth embodiment and shown in Step S34 of FIG. 6, the error processing performed for a case where damage, tampering and the like are detected in the computer program to be verified while files are copied from an external storage device 15 to a memory area, includes the following: setting a logical value of the executable flag to false for the inconsistent memory contents and prohibiting the computer program from operating.

Such shutting down and prohibiting is realized by the verification program executed by the controller 10 referencing the virtual memory on which the computer program to be verified is present, by using kernel performing dynamic memory allocation. In other words, the verification program executed by the controller 10 included in the information processing device 1 can restrict the operation of the computer program using a program management function of the kernel, if damage or tampering is found for the computer program.

Seventh Embodiment

A seventh embodiment exemplifies a computer program that is executed by a controller 10 included in an information processing device 1 and which restricts operation of the information processing device 1.

As described in the third aspect of the present invention and shown in Step S25 of FIG. 5, the error processing for a case where damage, tampering and the like are detected in a computer program while the computer program is present in a main memory 13, includes notifying an operating system of shutting down of the information processing device 1.

Furthermore, as described in the fourth aspect of the present invention and shown in Step S35 of FIG. 6, the error processing for a case where damage, tampering and the like are detected in a computer program while files are copied from an external storage device 15 to a memory area, includes restricting input/output of the information processing device 1. An example of the restriction is appropriate blocking of input from a control panel 18 shown in FIG. 2 so as not to allow the computer program to start up again, in which damage, tampering and the like are found.

A verification program executed by the controller 10 included in the information processing device 1 can notify shut-down and restrict input/output, thus restricting the operation of the information processing device 1 for a case where damage or tampering is found.

Eighth Embodiment

An eighth embodiment exemplifies an information processing device 1 using CRC as an inspection code stored in first and second memory areas.

CRC is widely used as an error detection code in the transfer of data from a magnetic storage device to a memory device and the like. In the information processing device 1, a 32 bit-wide CRC value, for example, represents contents of a computer program to be verified. This indicates that a 32-bit numerical value represents contents of the computer program that uses several hundred bytes of a main memory 13. A method for performing continuously periodic verification for the computer program includes: referencing contents of the main memory 13 in which the computer program is present, using a virtual memory table indicating the location of the computer program on the main memory 13; calculating a 32-bit numerical value; and determining whether the calculated 32-bit numerical value agrees with the initial 32-bit numerical value. That is, the contents of the main memory 13 are verified through the stored 32-bit numerical value in lieu of the data of several hundred bytes.

The information processing device 1 assures that the computer program to be verified is not damaged or tampered with for a case where a CRC value in a first verification and a CRC value in a continuously periodic verification are consistent.

The information processing device 1 of the present invention, which performs verification based on consistency of CRC values, can promptly perform a continuously periodic verification of the computer program. The verification program of the information processing device 1 can verify the computer program without lowering processing capacity of the controller 10 even if the controller 10 executes other processing in addition to the verification program.

Ninth Embodiment

A ninth embodiment exemplifies an information processing device 1 that determines predetermined timing of verification by a computer program that uses a timing signal generated independently of a computer program to be verified.

A preferable example of the timing signal is an output from an RTC 21. The RTC 21, a real-time clock circuit, which includes a battery 28 to continue operation even if a power unit 19 is suspended, operates asynchronously to the operation of a controller 10 and outputs time information.

An example of a typical RTC chip is a D-1302 manufactured by Maxim Integrated Products, Inc.; however, the RTC 21 is not limited thereto and any chip that operates asynchronously to an operation clock of the controller 10 can be appropriately selected for use in the information processing device 1 of the present invention. Since the RTC 21 can be a circuit independent of the controller 10, the RTC 21 can be provided as an extension board connected via an extension interface 16 included in the information processing device 1.

In Step S5 depicted in FIG. 1 as described in the third aspect of the present invention it is determined whether there is an interruption by the RTC 21 and a verification program stands by while reiterating Steps S3 to S5. Since an RTC interruption occurs according to time information that is independently delivered by a circuit driven by a battery 28 built in the RTC 21, it is asynchronous to the operation of the verification program standing by while performing the reiteration described above.

For example, suppose that the RTC 21 outputs an hour-minute-second value in an HH:MM:SS format and increments the value for SS once a second. If a value for SS is binary, the least significant bit shifts from true to false once every two seconds. With the introduction of the abovementioned technique to an interruption of the controller 10, it is possible to generate a condition to advance the processing of the verification program from Step S5 to S6 at a frequency of once every two seconds.

The abovementioned frequency can be flexibly designed by: a choice of RTC; an additional logic circuit that can convert output data from an RTC; and a program that can convert output data from the RTC. For example, the abovementioned frequency can be controlled by a computation such as an integral multiplication of a value that is computed by a function referencing output data delivered from the RTC 21. In this connection, the value is provided by a compiler that converts a computer program from a source code into an executable format.

The computer program to be verified can thus be periodically verified at timing asynchronous to the clock of the controller 10, by using a computer program that stands by waiting for an RTC interruption.

When all programs have been verified, the verification program stands by again by reiterating Steps S3 to S5, without terminating the processing in accordance with a branch of the flow as shown in Step S13 of FIG. 1. Therefore, the information processing device 1 of the present invention can continuously verify the computer programs.

As described above, the information processing device 1 can obtain timing information for verifying a computer program from a circuit, a function, and an external device, which have time information independent of the operation of the controller 10. In other words, while the controller 10 executes processing other than that for the verification program, the information processing device 1 can notify the controller 10 of the need for periodical verification. In such an arrangement, the information processing device 1 can verify the computer programs regularly and continuously.

Step S5 may be replaced by a step that detects a signal received from an external device connected via a communication interface 22 shown in FIG. 2. Alternatively, it may be possible to adopt a technique that allows the signal and the RTC interruption to be selectably used in Step S5.

Tenth Embodiment

A tenth embodiment exemplifies a setup of a gaming machine including: means for controlling a game by way of a computer program; means for displaying information relating to the game; and an information processing device of the present invention. In this example, the information processing device verifies the computer program.

Figure 7:
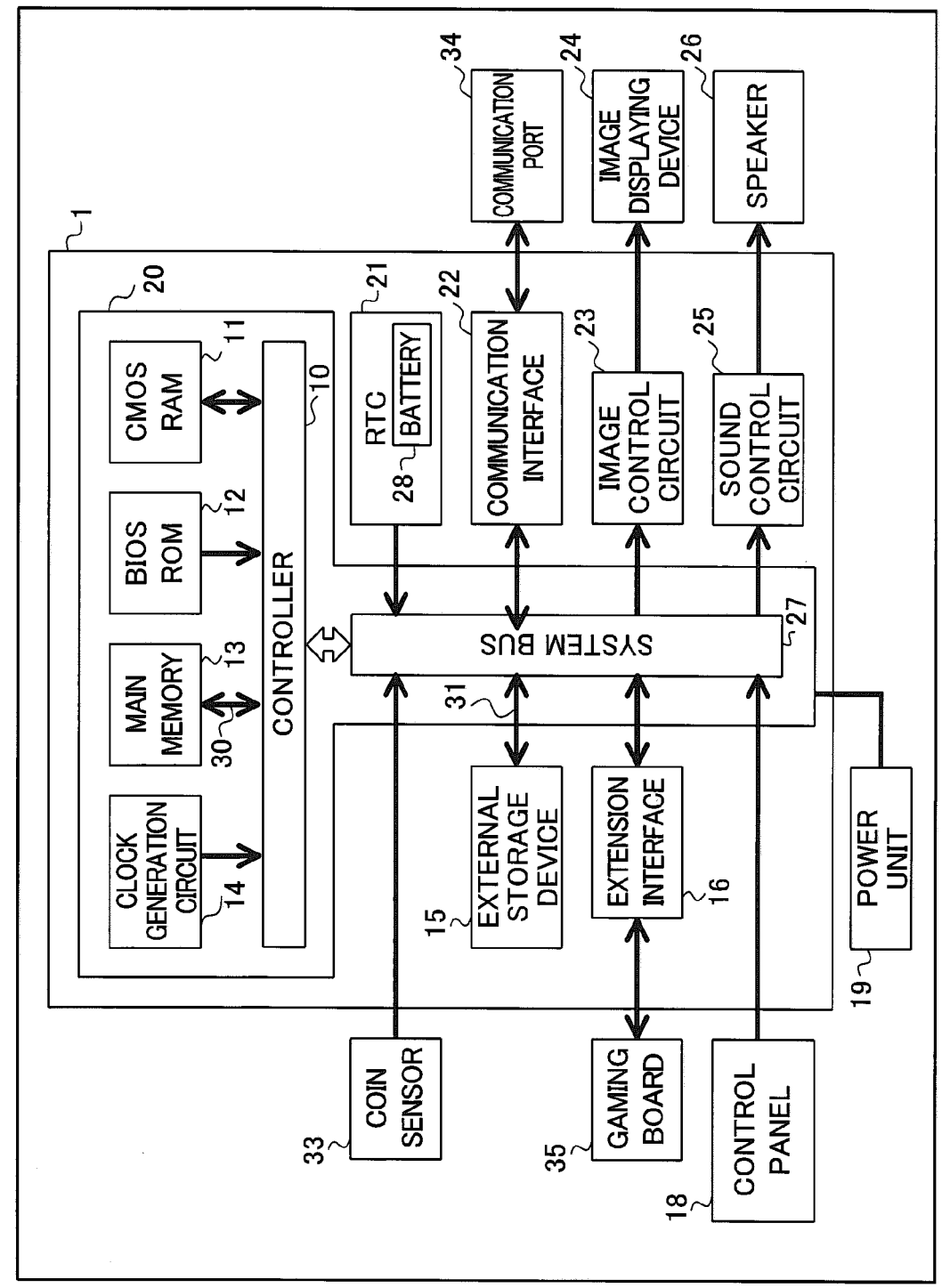
FIG. 7 is a block diagram showing a setup of a gaming machine according to the present invention.

FIG. 7 is a diagram showing a configuration of the gaming machine including the information processing device of the present invention. Descriptions are not repeated for the same portions as those in FIG. 2.

A gaming machine 40 includes an information processing device 1 and may be provided with a coin sensor 33 for detecting insertion of coins and a communication port 34 for communicating with external devices. The communication port 34 is connected to a communication interface 22 of the information processing device 1. A preferable example for the communication port 34 is a network connecting terminal with which a twist pair cable transmitting a 100 Base-T signal is compatible.

By using a computer program stored in an external storage device 15, the gaming machine 40 controls a game based on an input operation by a user from a control panel 18 and displays information related to the game by using an image control circuit 23 and an image displaying device 24. Furthermore, the gaming machine 40 can output sound related to the game using a sound control circuit 25 and a speaker 26.

Using the information processing device 1 of the present invention, the gaming machine 40 shown in FIG. 7 can verify a computer program that is stored in the external storage device 15 and present in a main memory 13 while it is used for the game.

As described in the fourth embodiment of the present invention, the information processing device 1 can assure that the computer program is not damaged or tampered with at a startup when the computer program is copied from the external storage device 15 to the main memory 13. In addition as shown in the third embodiment of the present invention, the information processing device 1 can continuously and periodically verify the computer program at predetermined timing while the computer program is present on the main memory 13, thus assuring that the computer program is not damaged or tampered with.

It may be possible for an administrator of the gaming machine 40 to start the verification of a gaming program by sending predetermined information to the information processing device 1 via the communication port 34.

If damage, tampering or the like is detected on the gaming program upon a startup from the initial state, the gaming machine 40 can prohibit the gaming program from starting up by restricting the information processing device 1 from executing input and output, as shown in Step S35 of FIG. 6 in the fourth embodiment the present invention. For example, a restriction of input and output is preferably performed through suspending the control panel 18 of FIG. 7 so as to prevent a user from instructing a startup of the gaming program.

If damage, tampering or the like is detected in the gaming program while the gaming program is present in the main memory 13, the execution of the gaming program can be terminated, as shown in Step S21 of FIG. 5 in the third embodiment of the present invention. Furthermore, if the gaming program with the detected damage, tampering or the like is found to be harmful according to an information database related to computer programs that are harmful for the operation of the information processing device 1 if they stay in the main memory 13, the information processing device 1 can notify an operating system of a required shut-down. The information database is stored, for example, in the external storage device 15 shown in FIG. 2.

The gaming machine 40 can thus control the game and display the game information by using the gaming program, which is verified by the information processing device 1. Therefore, while the gaming program is copied from the external storage device 15 to the main memory 13, the gaming machine 40 can assure that the gaming program is not damaged or tampered with.

When the gaming machine 40 detects damage, tampering or the like for the gaming program by a periodically continued verification, it can restrict not only the operation of the gaming program, but also the information processing device 1 so as to restrict the operation of the gaming machine 40. Therefore, the gaming machine 40 of the present invention can assure a gaming program continually and periodically, throughout the period in which the gaming program is present in the main memory 13.

Eleventh Embodiment

An eleventh embodiment exemplifies a gaming machine including: means for controlling a game by way of a computer program; means for displaying information related to the game; and an information processing device of the present invention. In this example, the information processing device inspects the computer program.

Figure 8:
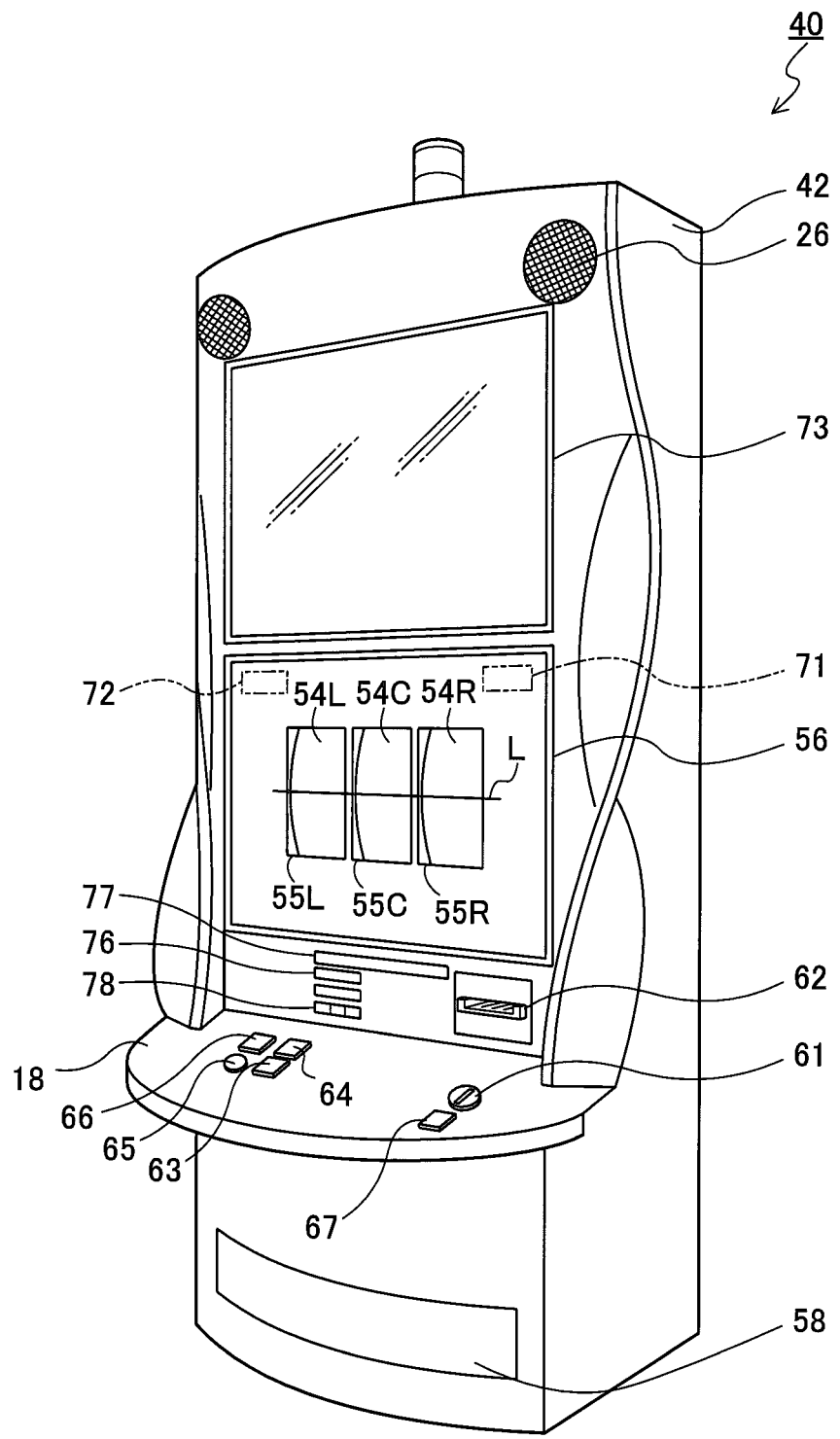
FIG. 8 is a perspective view showing an example of an appearance of the gaming machine according to the present invention.

FIG. 8 is a perspective view showing an example of the gaming machine according to an embodiment of the present invention, having the setup illustrated in FIG. 7. A gaming machine 40 according to the present embodiment is a slot machine. It should be noted that the gaming machine 40 is not restricted to a slot machine. For example, the gaming machine 40 may be a gaming machine with a single game such as a video slot machine, video card gaming machine, etc. In addition, the gaming machine 40 may be a so-called mass gaming machine (multi-terminal gaming machine), such as a horse racing gaming machine, a bingo gaming machine, a lottery gaming machine, etc., which requires a predetermined period of time before a display of the game results.

With the gaming machine 40, a player plays a game using coins or bills, or equivalent electronic value information. It should be noted that the credits used in the present invention are not particularly restricted. Examples of credits include medals, tokens, and electronic money.

The gaming machine 40 shown in FIG. 8 includes a cabinet 42. Three reels 54 (54L, 54C, and 54R) are rotatably placed inside the cabinet 42. A symbol sequence including 22 patterns (referred to as "symbols" hereinafter) is depicted on the outer face of each reel 54.

A lower image display panel 56 is provided in front of each reel 54. The lower image display panel 56 includes a transparent liquid crystal panel, which displays various kinds of information with respect to the game or images for providing visual effects in the game. The lower image display panel 56 serves as a device for displaying information according to the present invention. The lower image display panel 56 includes a credit amount display unit 71 and a payout amount display unit 72. The credit amount display unit 71 displays the number of coins inserted as credits in the form of an image. When a combination of symbols arranged on a pay line matches a predetermined combination, the payout amount display unit 72 displays an image of the number of coins to be paid out.

The lower image display panel 56 includes three display windows 55 (55L, 55C, and 55R) through which three symbols depicted on the outer face of each reel 54 are displayed. The lower image display panel 56 has a single pay line L that extends across the three display windows 55 along the horizontal direction. The pay line determines a winning combination of symbols. When the combination of symbols arranged along the pay line matches a predetermined combination, a predetermined number of coins are paid out according to the combination and the number of coins inserted (BET amount).

It should be noted that an arrangement may be made according to the present invention in which multiple pay lines are formed such that each line extends across the three display windows 55 in the horizontal direction or in oblique directions. With such an arrangement, the number of active pay lines is determined according to the number of coins inserted. When the combination of symbols arranged along any one of the active pay lines matches a predetermined combination, a predetermined number of coins are paid out according to the combination.

Furthermore, a touch panel (not shown) is provided in front of the lower image display panel 56, which allows the player to input various kinds of instructions.

Units provided below the lower image display panel 56 include: a control panel 18 including multiple buttons 63 through 67, which allow the player to input instructions for advancing the game; a coin slot 61 through which coins are inserted into the cabinet 42; and a bill validator 62.

The control panel 18 includes the spin button 63, the change button 64, the cash out button 65, the 1-BET button 66, and the maximum BET button 67. The spin button 63 allows the player to input an instruction to start rotation of the reels 54. The change button 64 is used to call a staff of an amusement facility so as to have money changing. The cash out button 65 allows the player to input an instruction to discharge the coins stored as the credits to a coin tray 58.

The 1-BET button 66 allows the player to input an instruction to bet a single coin on the game. The maximum BET button 67 allows the player to input an instruction to bet, from the coins stored as the credits, the maximum number of coins (in the present embodiment, 50) that the player can bet on a single game.

It should be noted that in the present invention, the phrase "credits are inserted" indicates that the credits are spent. Examples of situations in which credits are spent include: a situation in which the credits are bet on the game; and a situation in which the credits are spent on other operations such as switching the game mode, as described later. For example, suppose a situation in which the coins inserted into the coin slot 61 are directly bet on the game. With such a situation, the insertion of the coins into the coin slot 61 corresponds to the insertion of credits. On the other hand, suppose a situation in which the coins inserted into the coin slot 61 are temporarily stored as credits, and upon the player operating the 1-BET button 66 or the maximum BET button 67, the coins stored as the credits are bet on the game. With such a situation, using the coins stored as credits for betting on the game corresponds to the insertion of credits.

The bill validator 62 whether a bill is genuine, and stores the bill thus determined to be genuine in the cabinet 42.

An upper image display panel 73 is disposed in the front face of the cabinet 42. The upper image display panel 73 includes a liquid crystal panel which displays images for visual effects, images for introducing the game, and images for explaining the rules of the game. With the present embodiment, the upper image display panel 73 serves as a device for displaying information according to the present invention, in the same way as the lower image display panel 56. Alternatively, either the lower image display panel 56 or the upper image display panel 73 may serve as the device for displaying information.

The cabinet 42 has a speaker 26. A card reader 76, a data indicator 77, and a keypad 78 are provided below the lower image display panel 56.

The card reader 76 reads out data from a smart card, and writes data to the smart card. The smart card is a card possessed by a player that stores data for identifying the player, and data related to the history of the games played by the player. In addition, the smart card may store data that corresponds to coins, bills, or credits. Moreover, a magnetic stripe card may be employed instead of the smart card. The data indicator 77 includes a fluorescent display or the like for displaying the data read out via the card reader 76 or the data input by the player via the keypad 78.

The gaming machine 40 of the present invention, an embodiment of which is shown in FIG. 8, controls the game using a computer program based on input from the spin button 63 and the like, and displays information related to the game on the display window 55, the upper image display panel 73 and the like. The gaming machine 40 can continue to periodically assure that the computer program is not damaged, tampered with or the like, at a startup and throughout a period in which the computer program is present in the main memory 13 by periodical verification of the computer program performed by the information processing device 1.

Preferred embodiments of the present invention have been described above; however, the present invention is not limited to the scope of the abovementioned embodiments. Various modifications or improvements can be made to the above embodiments. Embodiments with such modifications or improvements can also be included in the scope of the present invention, as disclosed in the claims. For example, the present invention is also applicable to: an ATM (automatic teller machine); an automated dispenser of valuable papers such as railway ticket, commuter pass, air tickets, phone card and the like; an automated voucher terminal for sales voucher and the like; an automated legal document terminal for residence certification and the like.

The information processing device of the present invention for verifying programs can verify computer programs at a startup thereof from the initial state and during operation of the information processing device at predetermined timing, by using an operating system performing dynamic memory allocation. The abovementioned arrangement allows for: detection of damage, tampering or the like of the computer program on the operating system performing dynamic memory allocation; continuation of periodical verification for damage, tampering or the like of the computer program while present in the main memory; and assurance that the program is not damaged, tampered with or the like throughout a period in which the program is present on the main memory.

What is claimed is:

1. An apparatus for processing information, comprising:
a memory device; and
a controller, wherein
the controller is configured to:
access a memory area in the memory device storing information related to a location of computer program data;
calculate a first inspection code, a value representative of the contents of the memory device where the computer program lies, using contents of said memory area;
store said first inspection code;
upon occurrence of a predetermined condition, access said memory area in the memory device storing said information related to the location of computer program data;
calculate a second inspection code, a value representative of the contents of the memory device where the computer program lies, using contents of said memory area accessed upon occurrence of said predetermined condition;
store said second inspection code;
compare the stored first inspection code and the stored second inspection code;
if the second inspection code does not agree with the first inspection code, output an error signal indicating inconsistency between the first inspection code and the second inspection code; and
if the second inspection code agrees with the first inspection code, perform verification of the computer program.

2. The apparatus according to claim 1, wherein a verification program executed by the controller determines whether the second inspection code agrees with the first inspection code.

3. The apparatus according to claim 1, wherein the controller executes a verification program that restricts the operation of the computer program.

4. The apparatus according to claim 1, wherein the controller executes a verification program that restricts the operation of the apparatus for processing information.

5. The apparatus according to claim 1, wherein a Cyclic Redundancy Check is used for the first inspection code and the second inspection code.

6. The apparatus according to claim 1, wherein the controller determines the predetermined timing with a verification program that uses a timing signal generated independently of the computer program to be verified.

7. The apparatus according to claim 1, wherein
the apparatus operates in a gaming machine that includes a game controller for controlling a game with a gaming program and a display device for displaying information related to the game, and
the computer program verified by the apparatus is the gaming program.

8. The apparatus according to claim 2, further comprising a real-time clock circuit, wherein the real-time circuit operates asynchronously to the operation of the verification program and outputs time information.

9. The apparatus according to claim 8, further comprising a power unit and the real-time clock circuit includes battery, wherein the battery supplies power to continue operation if the power unit operation is suspended.

10. The apparatus according to claim 9, wherein the verification program is in a standby mode awaiting an interruption of the power unit.

* * * * *